United States Patent

Wakabayashi et al.

[19]

[11] Patent Number: 5,873,005
[45] Date of Patent: Feb. 16, 1999

[54] CONTROL DEVICE FOR A VIEW FINDER OPTICAL SYSTEM OF A VIEW FINDER CAMERA AND VIEW FINDER CAMERA EQUIPPED WITH SAME AND METHOD OF OPERATION OF SAME

[75] Inventors: Hiroshi Wakabayashi, Yokohama; Daiki Tsukahara, Hiratsuka, both of Japan

[73] Assignee: Nikon Corporation, Tokyo, Japan

[21] Appl. No.: 708,885

[22] Filed: Sep. 5, 1996

Related U.S. Application Data

[63] Continuation of Ser. No. 472,290, Jun. 7, 1995, abandoned.

[30] Foreign Application Priority Data

Jun. 8, 1994 [JP] Japan .................................. 6-126166

[51] Int. Cl.$^6$ ...................................................... G03B 17/00
[52] U.S. Cl. .............................................. 396/87; 396/379
[58] Field of Search .................................. 396/72, 84, 87, 396/373, 378, 379

[56] References Cited

U.S. PATENT DOCUMENTS 5,103,251   4/1992   Kudo .
5,150,143   9/1992   Ohno et al. .

*Primary Examiner*—David M. Gray

[57] ABSTRACT

A control device for use with a view finder optical system of a view finder camera having a variable focal length photographic optical system. The control device includes a view finder having a view finder optical system with a variably set view finder focal length that is set based on the focal length of the photographic optical system, a view finder angle of view detection unit that detects a view finder angle of view in accordance with a position of the view finder optical system and that outputs a first signal, a photographic optical system angle of view detection unit that detects a photographic optical system angle of view in accordance with the position of the photographic optical system and that outputs a second signal, and a view finder drive unit that receives the first and second signals and moves the view finder optical system so that the view finder angle of view and the photographic optical system angle of view correspond. Also provided is an imaging unit that includes a variable focal length view finder optical system, a variable focal length imaging optical system and a control unit that determines a focal length of the variable focal length imaging optical system and that causes the variable focal length view finder optical system to maintain a focal length that corresponds to the focal length of the imaging optical system. Finally, a method for adjusting a view field of a view finder is provided and involves determining the focal length of a variable focal length photographic optical system and adjusting the focal length of a variable focal length view finder optical system in accordance therewith.

21 Claims, 3 Drawing Sheets

FROM OUTPUT TERMINAL OF FINDER DRIVE CIRCUIT 20

TO INPUT TERMINAL OF CAMERA SIDE MICROCOMPUTER 19

CONTROL DEVICE FOR A VIEW FINDER OPTICAL SYSTEM OF A VIEW FINDER CAMERA AND VIEW FINDER CAMERA EQUIPPED WITH SAME AND METHOD OF OPERATION OF SAME

This application is a continuation of application Ser. No. 08/472,290, filed Jun. 7, 1995, now abandoned.

BACKGROUND OF THE INVENTION

1. Field of the Invention

The present invention relates to a control device for a view finder optical system of a view finder camera and, more particularly, to a control device that controls the angle of view of a view finder optical system so that it corresponds to an angle of view of a photographic lens of a view finder camera.

2. Description of the Related Art

In conventional rangefinder type cameras, a view finder optical system is configured to operate independently of a photographic lens, which photographic lens may even be of an interchangeable type.

Because rangefinder cameras having interchangeable lenses have at least two independent optical systems, it is necessary to change the angle of view of a view finder upon a change in use of a particular interchangeable photographic lens. This need to change the angle of view of the view finder is due to the fact that as the angle of view of the photographic lens changes, so too does the angle of view of the view finder. In other words, there is a shifting between the angle of view of the view finder as well as the photographic lens due to a change from one photographic lens to another.

Accordingly, typical rangefinder cameras having interchangeable photographic lenses incorporate mechanisms that change the angle of view of a view finder in accordance with a photographic lens that is mounted on a camera body.

For example, a typical rangefinder camera incorporating interchangeable lenses is the "LEICA M3" model camera which allows usage of three (3) different lens. Moreover, the "LEICA M3" has built-in field limit settings that are automatically set upon the exchange and mounting operation of particular photographic lens.

While the "LEICA M3" illustrates an exemplary prior art rangefinder camera that incorporates interchangeable lenses and that automatically sets corresponding field limits for its view finder optical system, the "LEICA M3" and, in particular, its field limit setting mechanism does not allow the usage of a zoom-type lens. The use of zoom-type lens with rangefinder cameras has not heretofore been addressed.

Generally, it is well known that when a photographer manipulates the focal length of a zoom type lens, he or she does so to change the focal length of the lens and the angle of view. Accordingly, a camera that is only capable of switching the field limit of its view finder in correspondence to particular lenses having particular focal lengths cannot operate with a zoom-type length which may take on an infinite or, at least, a large number of focal lengths.

Consequently, as the area being photographed with a zoom lens differs from the area of the field in the view finder, a photographer cannot verify the photographic range based on the field of the view finder.

Due to the problems mentioned above, presently available view finder cameras are restricted in their use of exchangeable lenses and are limited to lenses having fixed focal lengths.

SUMMARY OF THE INVENTION

It is an object of the present invention to solve the above-mentioned problems associated with prior art view finder cameras and to allow view finder cameras to utilize zoom type lenses and to provide photographers with view finder displays that accurately define an image field.

It is another object of the present invention to provide a control unit that causes the optical characteristics of a view finder to change based on the focal length characteristics of a photographic lens and, in particular, a zoom lens.

It is still another object of the present invention to provide a control device that causes the optical characteristics of a view finder optical system to follow the corresponding optical characteristics of a photographic lens so that a photographer is presented with a view finder image that accurately represents the image that will be captured by the photographic lens.

These and other objects are achieved by the present invention by providing a control device for use with a view finder optical system of a view finder camera having a variable focal length photographic optical system. The control device includes a view finder that has a view finder optical system with a variably set view finder focal length that is set based on the focal length of the photographic optical system, a view finder angle of view detection unit that detects a view finder angle of view in accordance with a position of the view finder optical system and that outputs a first signal, a photographic optical system angle of view detection unit that detects a photographic optical system angle of view in accordance with the position of the photographic optical system and that outputs a second signal and a view finder drive unit that receives the first and second signals and moves the view finder optical system so that the view finder angle of view and the photographic optical system angle of view correspond.

Additionally, objects of the present invention are achieved by providing an imaging unit that includes a variable focal length view finder optical system, a variable focal length imaging optical system and a control unit that determines a focal length of the variable focal length imaging optical system and that causes the variable focal length view finder optical system to maintain a focal length that corresponds to the focal length of the imaging optical system.

Finally, objects of the present invention are achieved by providing a method for adjusting a view field of a view finder and involves determining the focal length of a variable focal length photographic optical system and adjusting the focal length of a variable focal length view finder optical system in accordance therewith.

BRIEF DESCRIPTION OF THE DRAWING FIGURES

The aforementioned and other objects and advantages of the present invention will become apparent and readily appreciated from the following description of the preferred embodiments, taken in conjunction with the accompanying drawing figures, of which:

DETAILED DESCRIPTION OF THE PREFERRED EMBODIMENT

Figure 1:
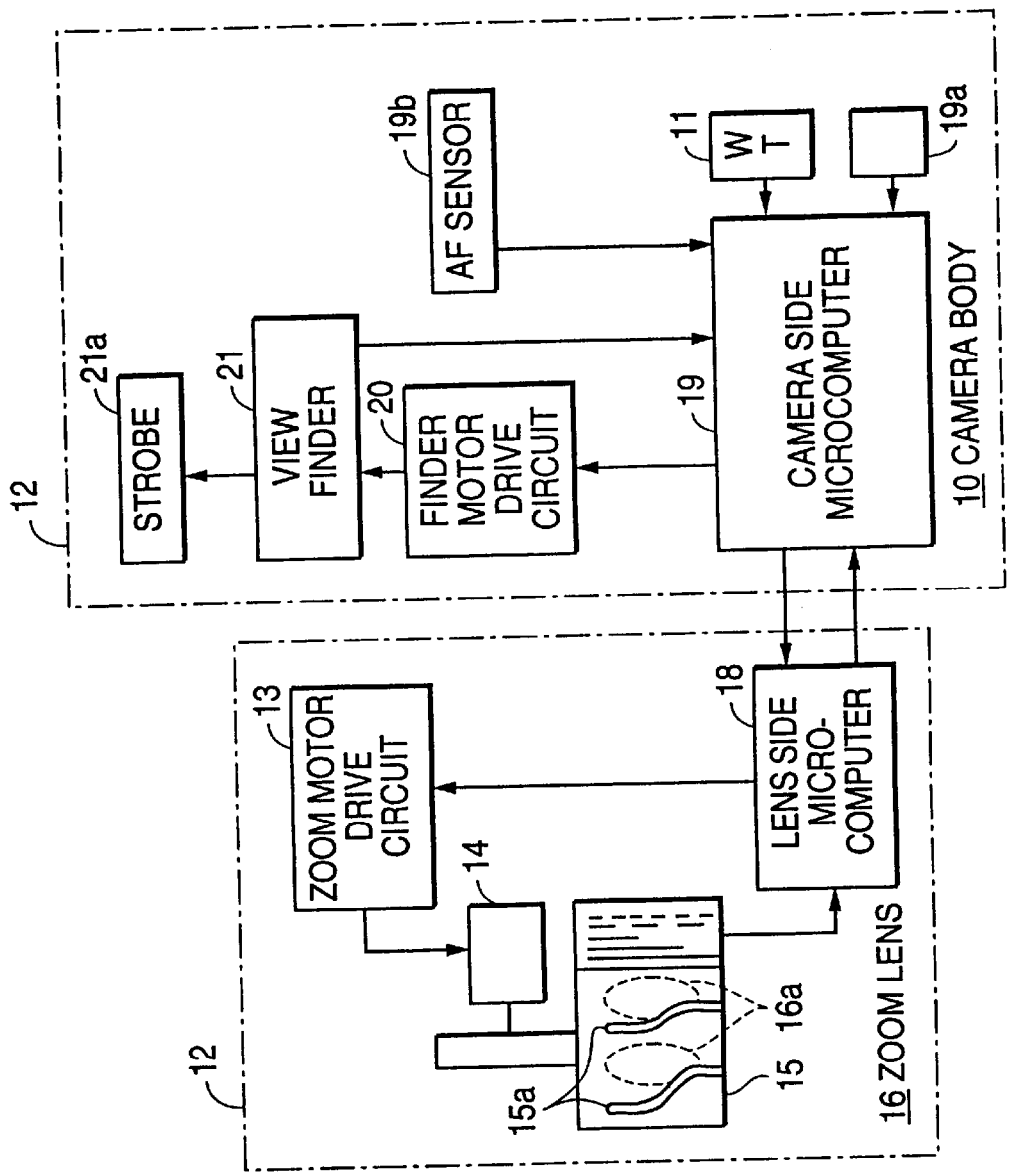
FIG. 1 is a block diagram that illustrates a view finder camera having a control device for use with a view finder optical system according to a preferred embodiment of the present invention.

The present invention is discussed in detail below with reference to the preferred embodiment shown in the attached drawing figures which were briefly described above. Like parts are referred to by like reference numerals.

When reviewing this detailed description of the preferred embodiment, it should be understood that while that embodiment concerns a view finder camera of the type that incorporates photography as the mode of recordation of still images, the present invention is not to be so limited. In fact, the present invention and the teachings presented herein may be applied to other devices in which imaging, still or motion, is to occur. For example, other imaging devices incorporating two or more separate and distinct optical systems may utilize the present invention's inventive aspects which are presented herein and which are meant to be included within the scope of the appended claims.

Referring now to FIG. 1, generally depicted therein is a block diagram that illustrates a view finder camera having a control device for use with a view finder optical system according to the preferred embodiment of the present invention. View finder camera 1 generally comprises a camera body 10 and a zoom lens 16. More particularly, a zoom switch 11 is installed on camera body 10 and a contact point of zoom switch 11 (not shown) is connected to an input terminal of a zoom motor drive circuit 13 via a communication channel between camera side microcomputer 19 and lens side microcomputer 18. Of course, the communication channel coupling camera side microcomputer 19 and lens side microcomputer 18 is to be configured to operate through a lens mount in a conventional manner.

An output terminal of a zoom motor drive circuit 13 is connected to a zoom motor 14 and the rotation of zoom motor 14 is transmitted to a zoom drive cam 15 through a gear. Zoom drive cam 15 has a cam grove 15a that moves a lens group 16a of zoom lens 16 according to the rotation of drive cam 15. A zoom encoder 17 is fixed on zoom drive cam 15 and a brush contact point (not shown) of zoom encoder 17 is connected to an input terminal of lens side microcomputer 18. Output terminal of lens side microcomputer 18 is connected to an input terminal of camera side microcomputer 19 via lens mount as indicated above.

An output terminal of camera side microcomputer 19 is connected to an input terminal of a view finder motor drive circuit 20 and an output terminal of view finder motor drive circuit 20 is connected to an input terminal of a zoom view finder 21. The driving force within view finder 21 is transmitted to a strobe 21a (e.g., a flash lighting device) and the output terminal of view finder 21 is connected to another input terminal of camera side microcomputer 19. An electrically erasable programmable read only memory (EEPROM) 19a, automatic focusing (AF) sensor 19b and the like are connected to other input terminals of camera side microcomputer 19. It will be readily appreciated that other non-volatile memory units, such as ROMs and EPROMs may be used.

Figure 2:
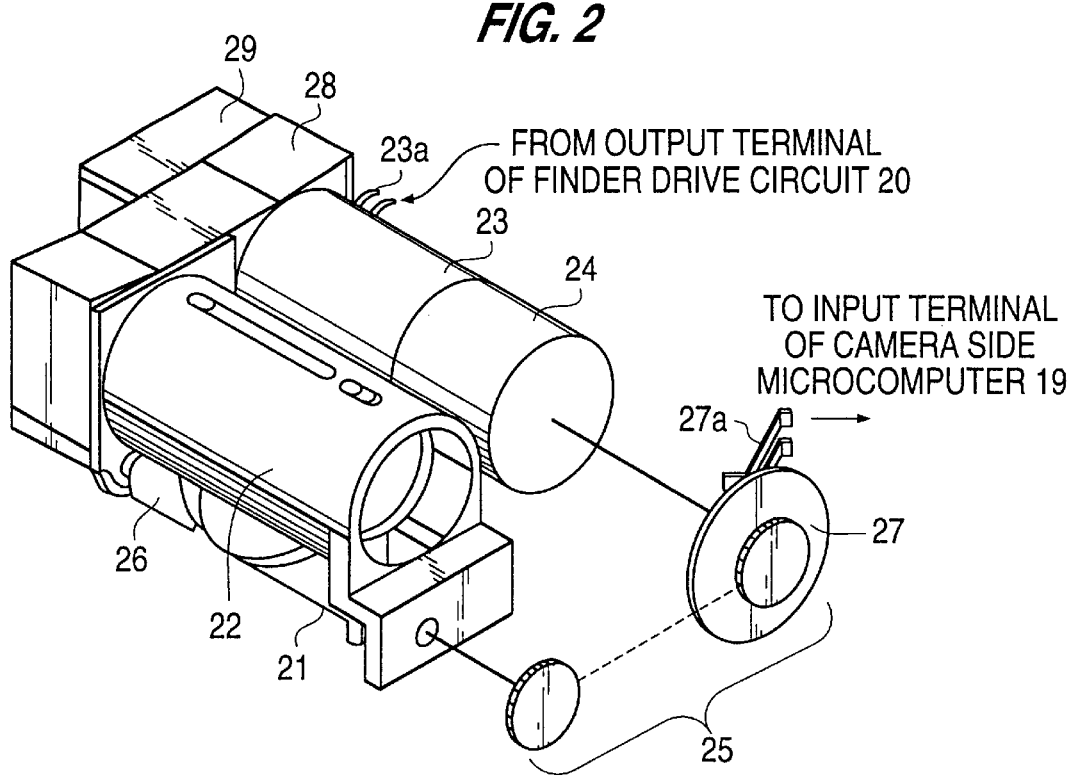
FIG. 2 is a perspective view of the zoom finder depicted in FIG. 1.

Referring now to FIG. 2, therein depicted is a perspective view of the zoom finder illustrated in FIG. 1. In particular, a view finder motor 23 is installed in parallel with veiw finder lens barrel 22. A veiw finder mirror section 28 is installed across finder lens barrel 22 and view finder motor 23, forming an open square configuration. View finder eye piece 29 is installed in the back of view finder mirror 28. Veiw finder motor 23 has input terminal 23a that is connected with the output terminal of view finder drive circuit 20 (FIG. 1). Rotation of view finder motor 23 is transmitted to a view finder drive cam 26 via a reduction gear 24 and a transmission gear system 25. Finder encoder 27 is coaxially fixed on transmission gear system 25. Additionally, finder encoder 27 has a brush contact point 27a that is connected to the input terminal of camera side microcomputer 19.

Figure 3:
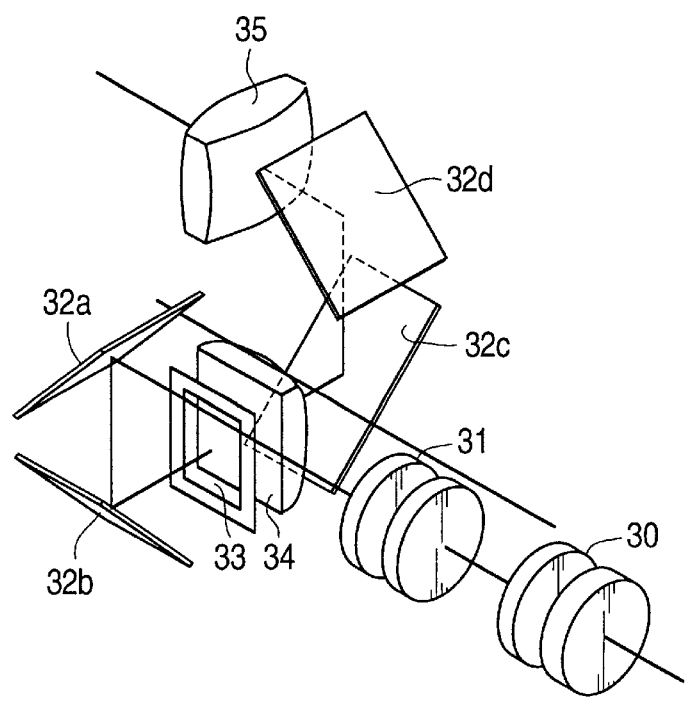
FIG. 3 is a view of the internal configuration of the finder lens barrel of the zoom finder depicted in FIG. 2.

Referring now to FIG. 3, therein depicted is a view of the internal configuration of the finder lens barrel 20 of the zoom veiw finder illustrated in FIG. 2. In particular, a compensation lens group 30 and variable magnification lens group 31 are placed along the optical axis of finder lens barrel 22. At the rear of variable magnification lens group 31, sequentially installed along the optical axis of finder lens barrel 22 are mirrors 32a and 32b, liquid crystal display element 33, condenser lens 34, mirrors 32c and 32d, and ocular lens 35 that are integrated in finder mirror part 28 and finder eyepiece part 29.

Figure 4:
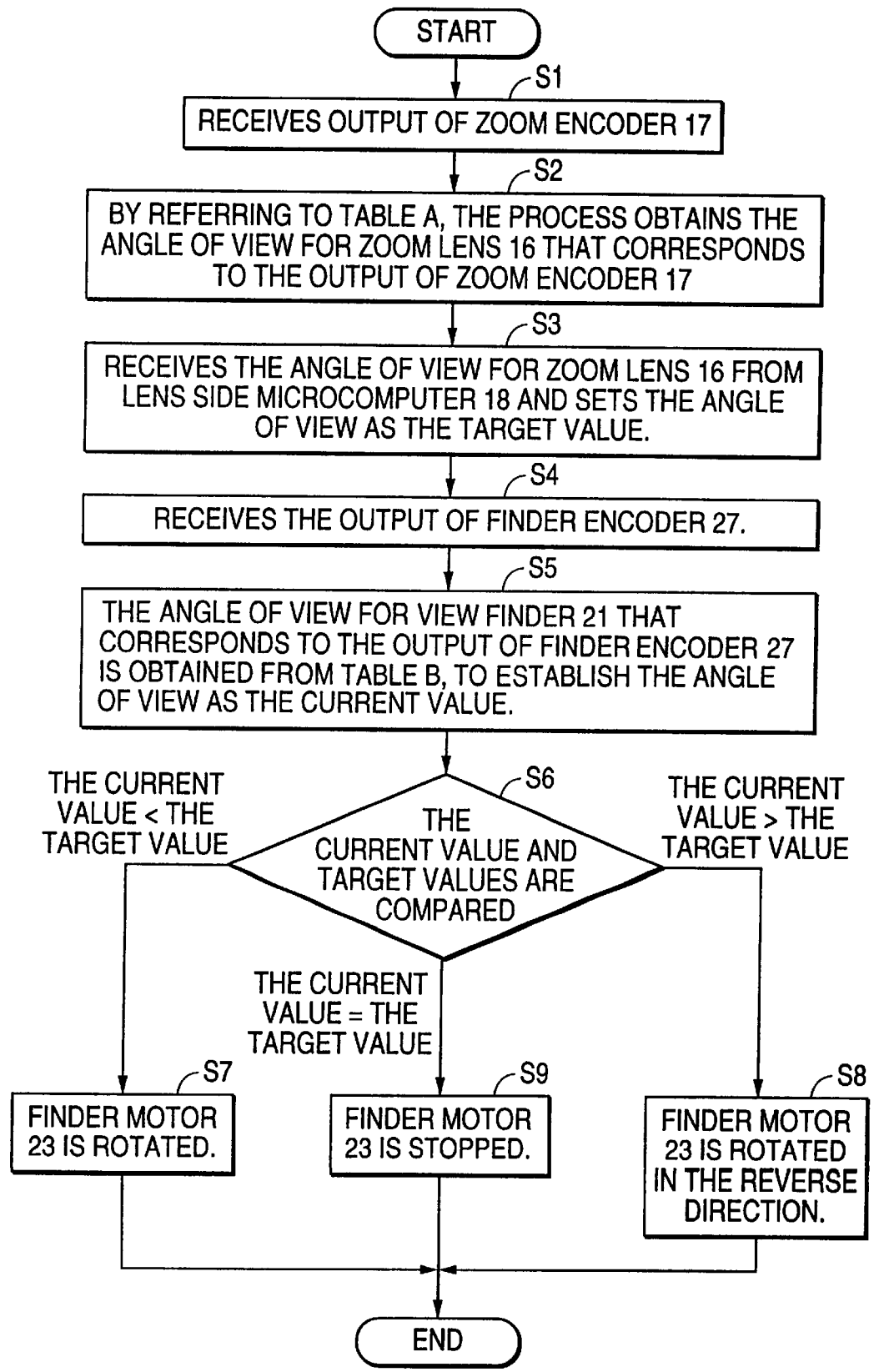
FIG. 4 is a flow chart that illustrates operations of the camera acccording to the preferred embodiment depicted in FIGS. 1–3.

Referring now to FIG. 4, therein depicted is a flowchart that illustrates operations of the camera according to the preferred embodiment depicted in FIGS. 1–3. Accordingly, a photographer operates zoom motor drive circuit 13, by pressing zoom switch 11, via a communication channel between camera side microcomputer 19 and lens side microcomputer 18 to rotate zoom motor 14. Rotation of zoom motor 14 causes lens group 16a within zoom lens 16 to be displaced forward and backward through zoom drive cam 15, thereby changing the angle of view of zoom lens 16.

At Steps S1 and S2, lens side microcomputer 18 receives the pulses from brush contact point of zoom encoder 17 that rotates with zoom drive cam 15 at Step S1 and thereafter refers to a Table A for the correlation between the conditions of brush contact point and the angle of view of zoom lens 16 that have been prepared in advance according to actual measurement, thereby obtaining the value for the angle of view of zoom lens 16.

At Step S3, camera side microcomputer 19 receives the value for the angle of view of zoom lens 16 from lens side microcomputer 18 as being the target value.

At Step S4, camera side microcomputer 19 receives the pulses from brush contact point 27a of finder encoder 27, and at Step S5 thereafter refers to a Table B for the correlation between the conditions of brush contact point 27a and angle of view for zoom finder 21 that have been prepared in advance according to actual measurement, thereby obtaining the current value for the angle of view of zoom finder 21.

At Steps S6, S7 and S8, camera side microcomputer 19 compares the above noted current value and the target value. If the current value is lower or less than the target value (i.e., "<"), processing proceeds to Step S7 where camera side microcomputer 19 causes finder motor 23 to rotate and variable magnification lens group 31 and compensation lens group 30 to be displaced by finder drive cam 26 to thereby increase the angle of view for veiw finder 21. And, if the current value exceeds the target value (i.e., ">"), processing proceeds to Step S8 where the angle of view of veiw finder 21 will be decreased. Finally, If the current value and the target value are equal within a specified permissible range (i.e., "="), camera side microcomputer 19 stops the movement of finder motor 23.

By continuously or intermittently repeating the operations discussed above, camera side microcomputer 19 changes the angles of view of veiw finder 21 in the direction that reduces the deviation between the current value and the target value in order for the angle of view of veiw finder 21 to follow and/or correspond to the angle of view of zoom lens 16.

Consequently, the aforementioned operations allow a photographer to verify, from the field of zoom finder 21, the range to actually be photographed through zoom lens 16.

It is important to note that the embodiment and the operations of the same discussed herein are configured so that camera side microcomputer 19 outputs pulse width modulation signals in response to the deviation between the above-noted current and target values. Thereafter, the output (i.e., the output pulse-width modulation signals) are smoothed and amplified at finder motor drive circuit 20 in order to drive finder motor 23.

Additionally, while the preferred embodiment is configured to detect angles of view by zoom encoder 17 and finder encoder 27, embodiments of the present invention are not so limited. For example, if a stepper motor is used for finder motor 23, camera side microcomputer 19 can drive finder motor 23 by generating a pulse sequence of the number that corresponds to the deviation between the above-noted current value and the target value. In such a case, finder angle of view detection can be achieved by configuring (e.g., via software and the like) camera side microcomputer 19 to count the pulse sequence to measure the lens position thereby negating the need for finder encoder 27.

Similarly, if a stepper motor is used for zoom motor 14, camera side microcomputer 19 can be configured (e.g., via software and the like) to generate the pulse sequence corresponding to the photographer's zoom operation, thereby driving zoom motor 14. In this case, a lens angle of view detection operation can be achieved by configuring lens side microcomputer 18 to count the pulse strings/sequence to measure the lens position thereby negating the need for a zoom encoder 17.

In the preferred embodiment of the present invention, angles of view of zoom lens 16 and zoom finder 21 are set to be equal. However, an entire range of angles of view need not become identical with the display screen in veiw finder 21. For instance, an actual display screen may be reduced to about 80% in consideration with the parallax of the view finder. In such case, a lens on the finder side may be displaced in the direction wherein the angle of view of zoom lens 16 and the angle of view of veiw finder 21 are maintained with a specific proportionate state.

Also, in the preferred embodiment of the present invention, the angles of view are used as a control measure for controlling the optical characteristics of the view finder optical system. However, as the angles of view may be converted to focal length, distance between a principal point of a lens and the display screen, and the lens magnification, it is inevitable that these values also may be used as control measures for controlling the optical characteristics of the view finder optical system.

Furthermore, in the preferred embodiment of the present invention, the control procedure is accomplished via software. However, embodiments of the present invention are not to be interpreted as limited to sample value control (i.e., digital sampling). For example, a part of, or an entire control procedure thereof, may be substituted by continuous and/or analog value control using a servo mechanism and the like.

Additionally, the driving force of finder motor 23 may be transmitted to strobe 21a to change the illuminating angle thereof. As a result, embodiments of the present invention now allows the illuminating angle of strobe 21a to follow the angles of view of a photographic lens.

Moreover, in the preferred embodiment of the present invention, the value for the angles of view is obtained by referring to tables within EEPROM 19a. However, an address of the tables may be set within an address area of EEPROM 19a to record the tables based on the encoder output and the measurement data during an adjustment period. As such, slight differences in lens characteristics and the mechanical systems of the embodiment of the present invention may be compensated to thereby obtain accurate values for angles of view.

As explained above, the preferred embodiment of the present invention now makes it possible to verify the photographic range from the view finder even if a zoom lens is used as a photographic lens since the present invention allows a view finder's angle of view to follow corresponding angles of view of a photographic lens. Consequently, a camera incorporating the present invention will allow a photographer to use a zoom lens to photograph in a wide range of focal lengths as well as to achieve photography with more flexible composition.

As such, although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. A control device to control a camera view finder having a variable focal length in accordance with a detected position of a detachable zoom lens, comprising:
    a first detection unit to detect a position of the view finder and output a first signal;
    a second detection unit to detect a zoom position of the detachable zoom lens and output a second signal; and
    a view finder drive unit receiving the first and second signals and moving the camera view finder in accordance with the detected zoom position of the detachable zoom lens.

2. The control device according to claim 1, wherein the view finder drive unit comprises:
    a motor to move the camera view finder; and
    a control unit receiving the first and second signals and controlling the motor to move the camera view finder.

3. The control device according to claim 2, wherein the motor is caused to rotate when a current angle of view of the camera view finder is different from a current angle of view of the detachable zoom lens.

4. The control device according to claim 3, wherein the camera view finder is moved to a position from among a plurality of predetermined positions based on the current angle of view of the detachable zoom lens.

5. The control device according to claim 1, further comprising:
    a parallax correcting unit to correct parallax between the camera view finder and the detachable zoom lens,
    wherein the camera view finder is positioned to have an angle of view that corresponds with an angle of view of the detachable zoom lens and to provide a view field that is parallax corrected in accordance with the operation of the parallax correcting unit.

6. The control device according to claim 1, the control device being connected to a flash lighting device and a corresponding flash lighting device positioning unit,
    wherein the flash lighting device positioning unit is operated in accordance with the second signal to position the flash lighting device so that a photographic subject in the field of view defined by the detachable zoom lens angle of view is properly illuminated.

7. The control device according to claim 1, wherein the detachable zoom lens is disposed within an interchangeable lens barrel structure.

8. An imaging unit comprising:

a view finder having a variable focal length;

a detachable zoom lens having a variable focal length; and a control unit to determine a focal length of said detachable zoom lens and vary the focal length of said view finder in accordance with the focal length of said detachable zoom lens.

9. The imaging unit of claim 8, wherein the control unit causes the focal length of said view finder to vary in accordance with a target value of the focal length of said detachable zoom lens.

10. The imaging unit of claim 8, wherein the control unit sets the focal length of said view finder to a predetermined length based on the focal length of the detachable zoom lens.

11. The imaging unit of claim 8, further comprising:

a parallax correction unit to correct said view finder for parallax with said detachable zoom lens.

12. The imaging unit of claim 8, further comprising:

a flash lighting unit to illuminate a scene to be imaged by the imaging unit; and a flash lighting unit positioning device configured to be operated in accordance with the focal length of said detachable zoom lens so that the image is properly illuminated.

13. The imaging unit of claim 8, wherein said detachable zoom lens is an exchangeable lens barrel structure including a plurality of movable lenses.

14. A method for adjusting a view field of a variable length view finder and a detachable zoom lens, comprising the steps of:

determining the focal length of the detachable zoom lens; and adjusting the focal length of the view finder in accordance with the focal length of the detachable zoom lens as determined during the determining step.

15. The method of claim 14, further comprising the steps of:

determining the focal length of the view finder; and adjusting the focal length of the view finder when the focal length of the view finder and the focal length of the detachable zoom lens differ by a pre-determined amount.

16. The method of claim 14, wherein the adjusting step includes moving the detachable zoom lens with a rotatable cam.

17. A view finder control device for a view finder having a variable focal length connected to an independent zoom optical system, comprising:

a first angle of view detection unit detecting an angle of view of the view finder based upon the position of the independent zoom optical system and producing a first corresponding signal;

a second angle of view detection unit detecting an angle of view of the view finder based on the position of the view finder and producing a second corresponding signal; and a view finder driver receiving the first and second signals and driving the independent zoom optical system so that the first signal and the second signal are maintained at predetermined levels.

18. The view finder control device of claim 17, further comprising:

a motor causing movement of the independent zoom optical system; and a controller receiving the first and second signals and causing the motor to move the independent zoom optical system so that the first and second signals are maintained at predetermined levels.

19. The view finder control device of claim 17, wherein the first and second signals are maintained at predetermined levels when the angle of view of the independent zoom optical system and the angle of view of the photographic lens are related in a predetermined manner.

20. The view finder control device of claim 19, wherein the predetermined manner requires that the independent zoom optical system and the lens have the same angle of view.

21. The view finder control device of claim 19, wherein the predetermined manner requires that the independent optical system and the photographic lens have respective angles of view that are mutually consistent based on a predetermined angle of view setting.

* * * * *